United States Patent [19]
Alpert et al.

[11] Patent Number: 5,481,751
[45] Date of Patent: Jan. 2, 1996

[54] APPARATUS AND METHOD FOR STORING PARTIALLY-DECODED INSTRUCTIONS IN THE INSTRUCTION CACHE OF A CPU HAVING MULTIPLE EXECUTION UNITS

[75] Inventors: Donald B. Alpert, Santa Clara; Dror Avnon, Milpitas; Amos Ben-Meir, Fremont, all of Calif.; Ran Talmudi, Ra'Anana, Israel

[73] Assignee: National Semiconductor Corporation, Santa Clara, Calif.

[21] Appl. No.: 323,586

[22] Filed: Oct. 17, 1994

Related U.S. Application Data

[63] Continuation of Ser. No. 150,581, Nov. 9, 1993, abandoned, which is a continuation of Ser. No. 529,869, May 29, 1990, abandoned.

[51] Int. Cl.$^6$ ........................................ G06F 9/38
[52] U.S. Cl. ................ 395/800; 395/375; 364/DIG. 1; 364/232.23; 364/232.8; 364/262.8
[58] Field of Search ...................................... 395/800, 375

[56] References Cited

U.S. PATENT DOCUMENTS

| | | | |
|---|---|---|---|
| 4,589,087 | 5/1986 | Aaslander et al. | 395/375 |
| 4,620,275 | 10/1986 | Wallach et al. | 395/800 |
| 4,646,233 | 2/1987 | Weatherford et al. | 395/425 |

(List continued on next page.)

FOREIGN PATENT DOCUMENTS

| | | |
|---|---|---|
| 0363222 | 4/1990 | European Pat. Off. . |
| 90/03001 | 3/1990 | WIPO . |

OTHER PUBLICATIONS

Bandyopadhyay et al. "Micro–Coded Based RISC Architecture"; 1987, IEEE.
McGeady "The i960CA Super Scalar Implemation of 80960 Architecture", IEEE 1990.
Hinton "80960–next generation" 1989 IEEE.
T. Baber "Headroom and Legroom in the 80960 architecture" 1990, IEEE.
G. B. Steven, S. M. Gray, & R. G. Adams; HARP: A Parallel Pipelined RISC Processor, Microprocessors & Micro systems, vol. 13, No. 9 Nov. 1989 London, GB; pp. 579–587.
David Ditzel, et al.; Branch Folding in the Crisp Microprocessor; Reducing Branch Delay to Zero; 14th Annual Internat'l Symposium on Computer Architecture; Jun. 2–5, 1987; pp. 1–9.
David Ditzel, et al.; The Hardware Architecture of the Crisp Microprocessor; AT&T Info Systems; 1987, ACM; pp. 309–319.

*Primary Examiner*—Alyssa H. Bowler
*Assistant Examiner*—L. Donaghue
*Attorney, Agent, or Firm*—Limbach & Limbach

[57] ABSTRACT

A microprocessor partially decodes instructions retrieved from main memory before placing them into the microprocessor's integrated instruction cache. Each storage location in the instruction cache includes two slots for decoded instructions. One slot controls one of the microprocessor's integer pipelines and a port to the microprocessor's data cache. A second slot controls the second integer pipeline or one of the microprocessor's floating point units. The instructions retrieved from main memory are decoded by a loader unit which decodes the instructions from the compact form as stored in main memory and places them into the two slots of the instruction cache entry according to their functions. In addition, auxiliary information is placed in the cache entry along with the instruction to control parallel execution as well as emulation of complex instructions. A bit in each instruction cache entry indicates whether the instructions in the two slots are independent, so that they can be executed in parallel, or dependent, so that they must be executed sequentially. Using a single bit for this purpose allows two dependent instructions to be stored in the slots of the single cache entry.

2 Claims, 3 Drawing Sheets

Microfiche Appendix Included
(214 Microfiche, 3 Pages)

U.S. PATENT DOCUMENTS

| | | | |
|---|---|---|---|
| 4,766,566 | 8/1988 | Chuang | 395/375 |
| 4,858,105 | 8/1989 | Kuriyama et al. | 395/375 |
| 4,873,629 | 10/1989 | Harris et al. | 364/200 |
| 5,050,068 | 9/1991 | Dollas et al. | 395/375 |
| 5,050,070 | 9/1991 | Chastain et al. | 395/375 |
| 5,129,067 | 7/1992 | Johnson | 395/375 |
| 5,233,694 | 8/1993 | Hotta et al. | 395/375 |

(214 Microfiche, 3 Pages)

* LOAD / STORE IN SLOT B ONLY FOR SEQUENTIAL EXECUTION

APPARATUS AND METHOD FOR STORING PARTIALLY-DECODED INSTRUCTIONS IN THE INSTRUCTION CACHE OF A CPU HAVING MULTIPLE EXECUTION UNITS

This is a continuation of application Ser. No. 08/150,581, filed on Nov. 9, 1993, now abandoned, which is a continuation of Ser. No. 07/529,869 filed on May 29, 1990, now abandoned.

COPYRIGHT NOTICE AND MICROFICHE APPENDIX

This patent document includes a microfiche appendix (3 pages, 214 fiches) which contains unpublished material which is subject to copyright protection. The copyright owner, National Semiconductor Corporation, has no objection to the facsimile reproduction by anyone of the patent document or the patent disclosure, as it appears in the U.S. Patent and Trademark Office patent file or records, but otherwise reserves all rights whatsoever.

BACKGROUND OF THE INVENTION

1. Field of the Invention

The present invention relates to microprocessor architectures and, in particular, to a microprocessor that partially decodes instructions retrieved from external memory before storing them in an internal instruction cache. Partially decoded instructions are retrieved from the internal cache for either parallel or sequential execution by multiple, parallel, pipelined functional units.

2. Discussion of the Prior Art

In recent years, there has been a trend in the design of microprocessor architectures from Complex Instruction Set Computers (CISC) toward Reduced Instruction Set Computers (RISC) to achieve high performance while maintaining simplicity of design.

In a CISC architecture, each macroinstruction received by the processor must be decoded internally into a series of microinstruction subroutines. These microinstruction subroutines are then executed by the microprocessor.

In a RISC architecture, the number of macroinstructions which the processor can understand and execute is greatly reduced. Further, those macroinstructions which the processor can understand and execute are very basic so that the processor either does not decode them into any microinstructions (the macroinstruction is executed in its macro form) or the decoded microinstruction subroutine involves very few microinstructions.

The transition from CISC architectures to RISC architectures has been driven by two fundamental developments in computer design that are now being extensively applied to microprocessors. These developments are integrated cache memory and optimizing compilers.

A cache memory is a small, high speed buffer located between the processor and main memory to hold the instructions and data most recently used by the processor. Experience shows that computers very commonly exhibit strong characteristics of locality in their memory references. That is, references tend to occur frequently either to locations that have recently been referred to (temporal locality) or to locations that are near others that have recently been referred to (spatial locality). As a consequence of this locality, a cache memory that is much smaller than main memory can capture the large majority of a program's memory references. Because the cache memory is relatively small, it can be realized from a faster memory technology than would be economical for the much larger main memory.

Before the development of cache memory techniques for use in mainframe computers, there was a large imbalance between the cycle time of a processor and that of memory. This imbalance was a result of the processor being realized from relatively high speed bipolar semiconductor technology and the memory being realized from much slower magnetic-core technology. The inherent speed difference between logic and memory spurred the development of complex instruction sets that would permit the fetching of a single instruction from memory to control the operation of the processor for several clock cycles. The imbalance between processor and memory speeds was also characteristic of the early generations of 32-bit microprocessors. Those microprocessors would commonly take 4 or 5 clock cycles for each memory access.

Without the introduction of integrated cache memory, it is unlikely that RISC architectures would have become competitive with CISC architectures. Because a RISC processor executes more instructions than does a CISC processor to accomplish the same task, a RISC processor can deliver performance equivalent to that of a CISC only if a faster and more expensive memory system is employed. Integrated cache memory enables a RISC processor to fetch an instruction in the same time required to execute the instruction by an efficient processor pipeline.

The second development that has led to the effectiveness of RISC architectures is optimizing compilers. A compiler, which may be implemented in either hardware or software, translates a computer program from the high-level language used by the programmer into the machine language understood by the computer.

For many years after the introduction of high-level languages, computers were still extensively programmed in assembly language. Assembly language is a low-level source code language employing crude mnemonics that are more easily remembered by the programmer than object-code or binary equivalents. The advantages of improved software productivity and translatability of high-level language programming were clear, but simple compilers produced inefficient code. Early generations of 32-bit microprocessors were developed with consideration for assembly language programming and simple compilers.

More recently, advances in compiler technology are being applied to microprocessors. Optimizing compilers can analyze a program to allocate large numbers of registers efficiently and to manage processor pipeline resources. As a consequence, high-level language programs can execute with performance comparable to or exceeding that of assembly programs.

Many of the leading pioneers in RISC developments have been compiler specialists who have demonstrated that optimizing compilers can produce highly efficient code for simple, regular architectures.

Highly integrated single-chip microprocessors employ both pipelined and parallel execution to improve performance. Pipelined execution means that while the microprocessor is fetching one instruction, it can be simultaneously decoding a second instruction, reading source operands for a third instruction, calculating results for a fourth instruction and writing results for a fifth instruction. Parallel execution means that the microprocessor can initiate the operands for two or more independent instructions simultaneously in separate functional units.

As stated above, one of the main challenges in designing a high-performance microprocessor with multiple, pipelined functional units is to provide sufficient instruction memory on-chip and to access the instruction memory efficiently to control the functional units.

The requirement for efficient control of a microprocessor's functional units dictates a regular instruction format that is simple to decode. However, in conventional microprocessor architectures, instructions in main memory are highly encoded and of variable length to make efficient use of space in main memory and the limited bandwidth available between the microprocessor and the main memory.

SUMMARY OF THE INVENTION

The present invention provides a microprocessor that resolves the conflicting requirements for efficient use of main memory storage space and efficient control of the functional units by partially decoding instructions retrieved from main memory before placing them into the microprocessor's integrated instruction cache. Each entry in the instruction cache has two slots for partially decoded instructions. One slot controls one of the microprocessor's execution pipelines and a port to its data cache. The second slot controls a second execution pipeline, or one of the microprocessor's floating point units, or a control transfer instruction. An instruction decoding unit, or loader, decodes instructions from their compact format as stored in main memory and places them into the two slots of the instruction cache entry according to their functions. Auxiliary information is also placed in the cache entry along with the instruction to control parallel execution and emulation of complex instructions. A bit in each cache entry indicates whether the instructions in the two slots for that entry are independent, so that they can be executed in parallel, or dependent, so that they must be executed sequentially. Using a single bit for this purpose allows two dependent instructions to be stored in the slots of a single cache entry. Otherwise, the two instructions would have to be stored in separate entries and only one-half of the cache memory would be utilized in those two entries.

A better understanding of the features and advantages of a partially decoded instruction cache in accordance with the present invention will be obtained by reference to the following detailed description of the invention and accompanying drawings which set forth an illustrative embodiment in which the principles of the invention are utilized.

DETAILED DESCRIPTION OF THE INVENTION

Figure 1:
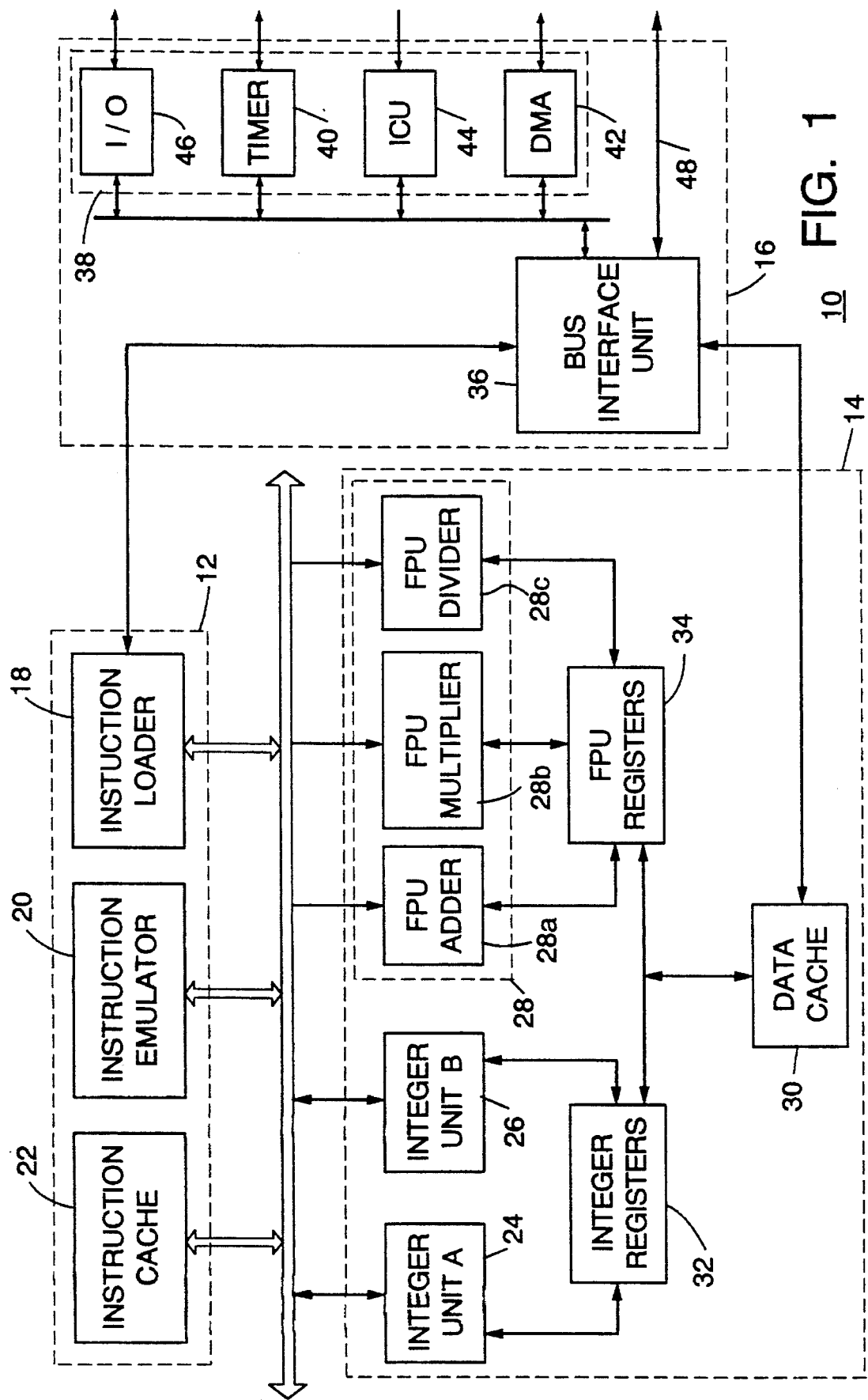
FIG. 1 is a block diagram illustrating a microprocessor architecture that incorporates the concepts of the present invention.

FIG. 1 shows a block diagram of a microprocessor 10 that includes multiple, pipelined functional units that are capable of executing two instructions in parallel.

The microprocessor 10 includes three main sections: an instruction processor 12, an execution processor 14 and a bus interface processor 16.

The instruction processor 12 includes three modules: an instruction loader 18, an instruction emulator 20 and an instruction cache 22. These modules load instructions from the external system through the bus interface processor 16, store the instructions in the instruction cache 22 and provide pairs of instructions to the execution processor 14 for execution.

The execution processor 14 includes two 4-stage pipelined integer execution units 24 and 26, a double-precision 5-stage pipelined floating point execution unit 28, and a 1024 byte data cache 30. A set of integer registers 32 services the two integer units 24 and 26; similarly, a set of floating point registers 34 services the floating point execution unit 28.

The bus interface processor 16 includes a bus interface unit 36 and a number of system modules 38. The bus interface unit 36 controls the bus accesses requested by both the instruction processor 12 and the execution processor 14. In the illustrated embodiment, the system modules 38 include a timer 40, a direct memory access (DMA) controller 42, an interrupt control unit (ICU) 44 and I/O buffers 46.

As described in greater detail below, the instruction loader 18 partially decodes instructions retrieved from main memory and places the partially decoded instructions in the instruction cache 22. That is, the instruction loader 18 translates an instruction stored in main memory (not shown) into the decoded format of the instruction cache 22. As will also be described in greater detail below, the instruction loader 18 is also responsible for checking whether any dependencies exist between consecutive instructions that are paired in a single instruction cache entry.

The instruction cache 22 contains 512 entries for partially-decoded instructions.

In accordance with one aspect of the present invention, and as explained in greater detail below, each entry in the instruction cache 22 contains either one or two instructions stored in a partially-decoded format for efficient control of the various functional units of the microprocessor 10.

In accordance with another aspect of the present invention, each entry in instruction cache 22 also contains auxiliary information that indicates whether the two instructions stored in that entry are independent, so that they can be executed in parallel, or dependent, so that they must be executed sequentially.

The instruction emulator 20 executes special instructions defined in the instruction set of the microprocessor 10. When the instruction loader 18 encounters such an instruction, it transfers control to the emulator 20. The emulator is responsible for generating a sequence of core instructions (defined below) that perform the function of a single complex instruction (defined below). In this regard, the emulator 20 provides ROM-resident microcode. The emulator 20 also controls exception processing and self-test operations.

The two 4-stage integer pipelines 24 and 26 perform basic arithmetic/logical operations and data memory references. Each integer pipeline 24,26 can execute instructions at a throughput of one per system clock cycle.

The floating point execution unit 28 includes three sub-units that perform single-precision and double-precision operations. An FPU adder sub-unit 28a is responsible for add and convert operations, a second sub-unit 28b is responsible for multiply operations and a third sub-unit 28c is responsible for divide operations.

When add and multiply operations are alternately executed, the floating point execution unit 28 can execute instructions at a throughput of one instruction per system clock cycle.

Memory references for the floating point execution unit 28 are controlled by one of the integer pipelines 24,26 and can be performed in parallel to floating-point operations.

Data memory references are performed using the 1-Kbyte data cache 30. The data cache 30 provides fast on-chip access to frequently used data. In the event that data are not located in the data cache 30, then off-chip references are performed by the bus interface unit (BIU) 36 using the pipelined system bus 48.

The data cache 30 employs a load scheduling technique so that it does not necessarily stall on misses. This means that the two execution pipelines 24,26 can continue processing instructions and initiating additional memory references while data is being read from main memory.

The bus interface unit 36 can receive requests for main memory accesses from either the instruction processor 12 or the execution processor 14. These requests are sent to the external pipelined bus 48. The external bus can be programmed to operate at half the frequency of the microprocessor 10; this allows for a simple instruction interface at a relatively low frequency while the microprocessor 10 executes a pair of instructions at full rate.

The instruction set of the microprocessor 10 is partitioned into a core part and a non-core part. The core part of the instruction set consists of performance critical instructions and addressing modes, together with some special-function instructions for essential system operations. The non-core part consists of the remainder of the instruction set. Performance critical instructions and addressing modes were selected based on an analysis and evaluation of the operating system (UNIX in this case) workload and various engineering, scientific and embedded controller applications. These instructions are executed directly as part of the RISC architecture of microprocessor 10.

An instruction set of the type described above is provided as part of a microfiche appendix to this patent document, "Swordfish Microprocessor Architecture Specification" Revision 2.0, February 1990, National Semiconductor Corporation, which appendix is hereby incorporated as an integral part of this Detailed Description of the Invention.

As stated above, special-function and non-core instructions are emulated in microprocessor 10 by macroinstruction subroutines using sequences of core instructions. That is, instructions that are a part of the overall instruction set of the microprocessor 10 architecture, but that lie outside the directly-implemented RISC core, are executed under control of the instruction emulator 20. When the instruction loader 18 encounters a non-core instruction, it either translates it into a pair of core instructions (for simple instructions like MOVB 1(R0),0(R1)) or transfers control to the instruction emulator 20. The instruction emulator 20 is responsible for generating a sequence of core instructions that perform the function of the single, complex instruction.

Figure 2:
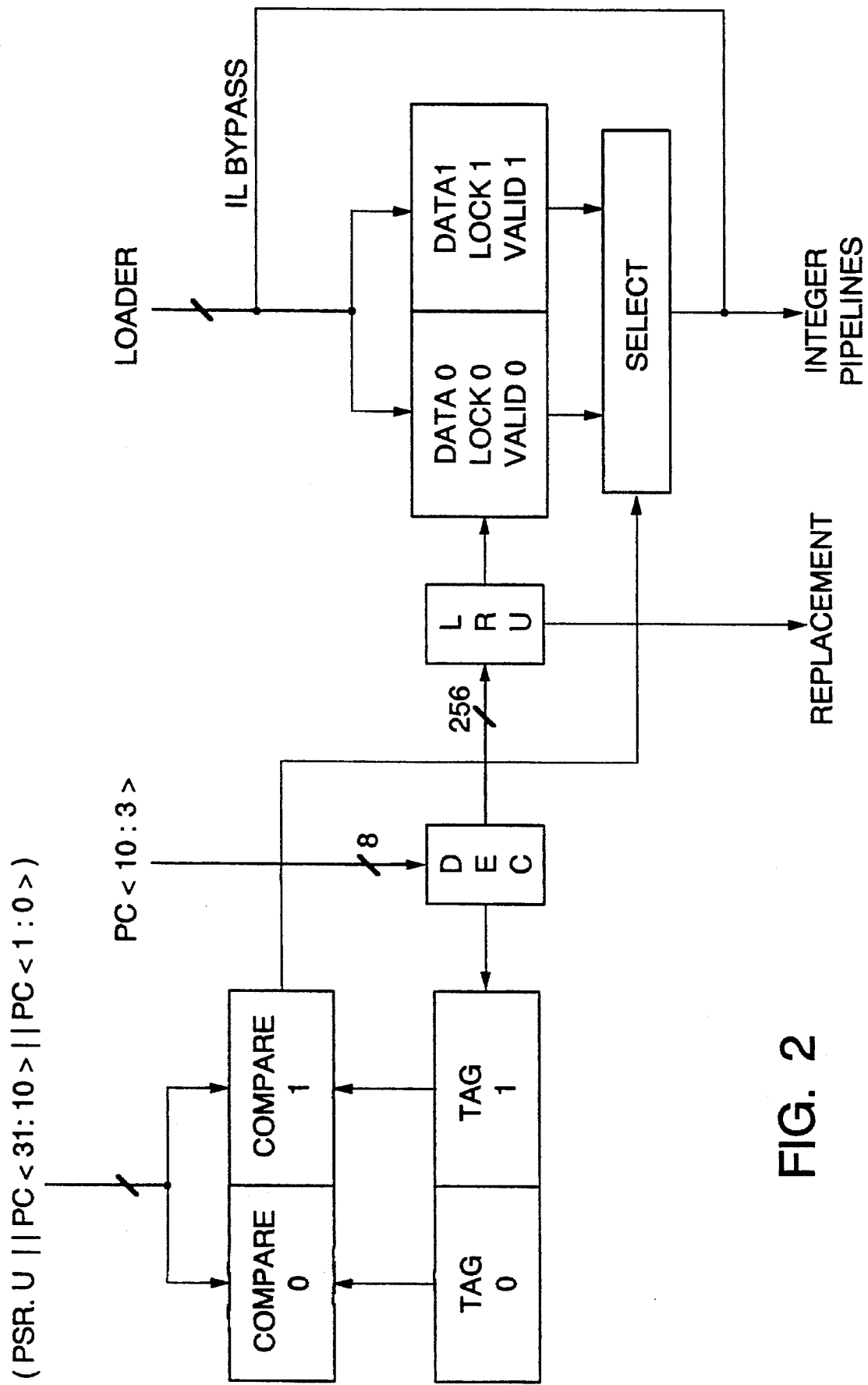
FIG. 2 is a block diagram illustrating the structure of a partially decoded instruction cache utilized in the FIG. 1 architecture.

FIG. 2 shows the structure of the instruction cache 22. The instruction cache 22 utilizes a 2-way, set-associative organization with 512 entries for partially decoded instructions. This means that for each memory address there are two entries in the instruction cache 22 where the instruction located at that address can be placed. The two entries are called a "set".

Figure 3:
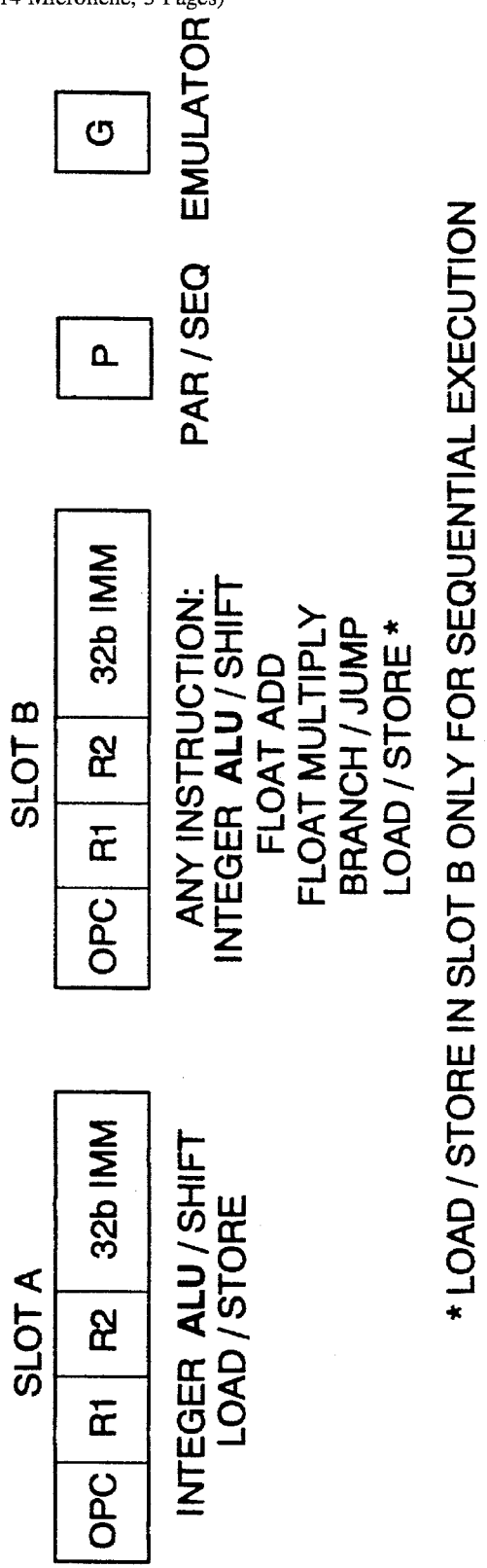
FIG. 3 is a simplified representation of a partially decoded entry stored on the instruction cache shown in FIG. 2.

As shown in FIG. 3, each instruction cache entry includes two slots, i.e. Slot A and Slot B. Thus, each entry can contain one or two partially-decoded instructions that are represented with fixed fields for opcode (Opc), source and destination register numbers (R1 and R2, respectively), and immediate values (32b IMM). The entry also includes auxiliary information used to control the sequence of instruction execution, including a bit P that indicates whether the entry contains two consecutive instructions that can be executed in parallel and a bit G that indicates whether the entry is for a complex instruction that is emulated, and additional information representing the length of the instruction(s) in a form that allows fast calculation of the next instruction's address.

Referring back to FIG. 2, associated with each entry in the instruction cache 22 is a 26-bit tag, TAG0 and TAG1, respectively, that holds the 22 most-significant bits, 3 least-significant bits and a User/Supervisor bit of the virtual address of the instruction stored in the entry. In the event that two consecutive instructions are paired in an entry, the tag corresponds to the instruction at the lower address. Associated with the tag are 2 bits that indicate whether the entry is valid and whether it is locked. For each set there is an additional single bit that indicates the entry within the set that is next to be replaced in a Least-Recently-Used (LRU) order.

The instruction cache 22 is enabled for an instruction fetch if a corresponding bit of the configuration register of microprocessor 10 which is used to enable or disable various operating modes of the microprocessor 10, is 1 and either address translation is disabled or the CI-bit is 0 in the level-2 Page Table Entry (PTE) used to translate the virtual address of the instruction.

If the instruction cache 22 is disabled, then the instruction fetch bypasses the instruction cache 22 and the contents of the instruction cache 22 are unaffected. The instruction is read directly from main memory, partially decoded by the instruction loader 18 to form an entry (which may contain two partially decoded instructions), and transferred to the integer pipelines 24, 26 via the IL BYPASS line for execution.

As shown in FIG. 2, if the instruction cache 22 is enabled for an instruction fetch, then eight bits, i.e. bits PC(10:3), of the instruction's address provided by the program counter (PC) are decoded to select the set of entries where the instruction may be stored. The selected set of four entries is read and the associated tags are compared with the 23 most-significant bits, i.e. PC(31:10), and 2 least-significant bits PC(1:0) of the instruction's virtual address. If one of the tags matches and the matching entry is valid, then the entry is selected for transfer to the integer pipelines 24,26 for execution. Otherwise, the missing instruction is read directly from main memory and partially decoded, as explained below.

If the referenced instruction is missing from the instruction cache 22 and the contents of the selected set are all locked, then the handling of the reference is identical to that described above for the case when the instruction cache 22 is disabled.

If the referenced instruction is missing from the instruction cache 22 and at least one of the entries in the selected set is not locked, then the following actions are taken. One of the entries is selected for replacement according to the least recently used (LRU) replacement algorithm and then the LRU pointer is updated. If the entry selected for replacement is locked, then the handling of the reference is identical to that described above for the case when the instruction cache 22 is disabled. Otherwise, the missing instruction is read directly from external memory and then partially decoded by instruction loader 18 to form an entry (that may contain two partially decoded instructions) which is transferred to the integer pipelines 24,26 for execution. If CIIN is not active during the bus cycles to read the missing instruction, then the partially decoded instruction is also written into the instruction cache entry selected for replacement, the associated valid bit is set, and the entry is locked if Lock-Instruction-Cache bit CFG.LIC in the configuration register is 1.

After the microprocessor 10 has completed fetching a missing instruction from external main memory, it will continue prefetching sequential instructions. For subsequent sequential instruction fetches, the microprocessor 10 searches the instruction cache 22 to determine whether the instruction is located on-chip. If the search is successful or a non-sequential instruction fetch occurs, then the microprocessor 10 ceases prefetching. Otherwise, the prefetched instructions are rapidly available for decoding and executing. The microprocessor 10 initiates prefetches only during bus cycles that would otherwise be idle because no off-chip data references are required.

It is possible to fetch an instruction and lock it into the instruction cache 22 without having to execute the instruction. This can be accomplished by enabling a Debug Trap (DBG) for a Program Counter value that matches two instruction's address. Debug Trap is a service routine that performs actions appropriate to this type-of exception. At the conclusion of the DBG routine, the REturn to Execution (RETX) instruction is executed to resume executing instructions at the point where the exception was recognized. The instruction will be fetched and placed into the Instruction Cache 32 before the trap is processed.

When the instruction which is locked in the instruction cache 22 gets to execution and a Debug Trap on that instruction is enabled, instead of executing the instruction, the processor will jump to the Debug Trap service routine. The service routine may set a breakpoint for the next instruction so that when the processor returns from the service routine, it will not execute the next instruction but rather will go again to the Debug Trap routine.

The process described above, which usually gets executed during system bootstrap, allows the user to store routines in the instruction cache 22, lock them and have them ready for operation without executing them during the locking process.

Further information relating to the architecture of microprocessor 10 and its cache locking capabilities is provided in commonly-assigned application Ser. No. 529,866, now U.S. Pat. No. 5,249,286, filed by Alpert et al on the same date as this application and titled SELECTIVELY LOCKING MEMORY LOCATIONS WITHIN A MICROPROCESSOR'S ON-CHIP CACHE; the just-referenced U.S. Pat. Ser. No. 5,249,286 is hereby incorporated by reference to provide further background information regarding the present invention.

The contents of the instruction cache 22 can be invalidated by software or by hardware.

The instruction cache 22 is invalidated by software as follows: The entire instruction cache contents, including locked entries, are invalidated while bit CFG.IC of the Configuration Register is 0. The LRU replacement information is also initialized to 0 while bit CFG.IC is 0. Cache Invalidate CINV instruction can be executed to invalidate the entire instruction cache contents. Executing CINV invalidates either the entire cache or only unlocked lines according the instruction's L-option.

The entire instruction cache 22 is invalidated in hardware by activating an $\overline{\text{INVIC}}$ input signal.

FIG. 3 shows a simplified view of a partially decoded entry stored in the instruction cache 22. As shown in FIG. 3, each entry has two slots for instructions. Slot A controls integer pipeline 24 and the port to data cache 30. Slot B controls the second integer pipe 26, or one of the floating point units or a control transfer instruction. Slot B can also control the port to data cache 30, but only if slot A is not using the data cache 30. As stated above, instruction loader 18 retrieves encoded instructions from their compact format in main memory and places them into slots A and B according to their functions.

Thus, in accordance with the present invention, the novel aspects of instruction cache 22 include (1) partially decoding instructions for storage in cache memory, (2) placing of instructions into two cache slots according to their function and (2) placing auxiliary information in the cache entries along with the instructions to control parallel execution and emulation of complex instructions.

As further shown in FIG. 3, a bit P in each instruction cache entry indicates whether the instructions in slots A and B are independent, so they can be executed in parallel, or dependent, so they must be executed sequentially.

An example of independent instructions that can be executed in parallel is:

Load 4(R0),R1 ; Addcd 4,R0

An example of dependent instructions requiring sequential execution is:

Addd R0, R1 ; Addd R1,R2

Using a single bit for this purpose allows two dependent instructions to be stored in the slots of a single cache entry, otherwise, the two instructions would have to be stored in separate entries and only ½ of the instruction cache 22 would be utilized in those two entries.

FIG. 3 also shows a bit G in each instruction cache entry that indicates whether the instructions in slots A and B are emulating a single, more complex instruction from main memory. For example, the loader translates the single instruction ADDD O(R0), R1 into the following pair of instructions in slots A and B and sets the sequential and emulation flags in the entry:

Load 0(R0), Temp

ADDD Temp, R1

In accordance with the pipelined organization of the microprocessor 10, every instruction executed by the microprocessor 10 goes through a series of stages. The two integer pipelines 24, 26 (FIG. 1) are able to work in parallel on instructions pairs. Integer unit 24 and integer unit 26 are not identical, the instructions that can be executed in integer unit 24 being a sub-set of those that can be executed in integer unit 26.

As stated above, instruction fetching is performed by the instruction loader 18 which stores decoded instructions in the instruction cache 22. The integer dual-pipe receives decoded instruction-pairs for execution.

Referring again to FIG. 3, as stated above, an instruction pair consists of two slots: Slot A and Slot B. The instruction in Slot A is scheduled for integer unit 24; the instruction in Slot B is scheduled for integer unit 26. Two instructions belonging to the same pair advance at the same time from one stage of the integer pipeline to the next, except in the case when the instruction in Slot B is delayed in the instruction decode stage of the pipeline as described below. In this case, the instruction in integer pipeline 24 can advance to the following pipeline stages. However, new instructions cannot enter the pipeline until the instruction decode stage is free in both pipeline unit 24 and pipeline unit 26.

Although the unit 24 and unit 26 instructions are executed in parallel (except in the case of the stall ID-B instruction), the Slot A instruction always logically precedes the corresponding Slot B instruction and, if the Slot A instruction cannot be completed due to an exception, then the corresponding Slot B instruction is discarded.

Figure 4:
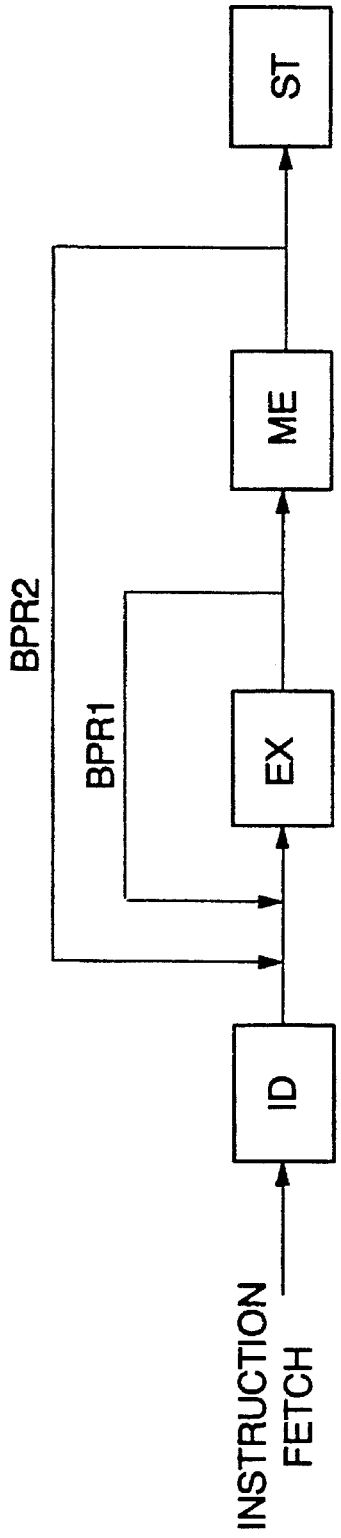
FIG. 4 is a block diagram illustrating the structure of the integer pipelines utilized in the microprocessor architecture shown in FIG. 1.

Referring to FIG. 4, each of the integer pipeline units 24, 26 includes four stages: an instruction decode stage (ID), an execute stage (EX), a memory access stage (ME) and a store result stage (ST).

An instruction is fed into the ID stage of the integer unit for which it is scheduled where its decoding is completed and register source operands are read. In the EX stage, the arithmetic/logical unit of the microprocessor 10 is activated to compute the instruction's results or to compute the effective memory address for Load/Store instructions. In the ME stage, the data cache 30 (FIG. 1) is accessed by Load/Store instructions and exception conditions are checked. In the ST stage, results are written to the register file, or to the data cache 30 in the case of a Store instruction, and Program Status Register (PSR) flags are updated. At this stage, the instruction can no longer be undone.

As further shown in FIG. 4, results from the EX stage and the ME stage can be fed back to the ID stage, thus enabling instruction latency of 1 or 2 cycles.

In the absence of any delays, the dual execution pipeline of microprocessor 10 accepts a new instruction pair every clock cycle (i.e., peak throughput of two instructions per cycle) and scrolls all other instructions down one stage along the pipeline. The dual pipeline includes a global stalling mechanism by which any functional unit can stall the pipeline if it detects a hazard. Each stalls the corresponding stage and all stages preceding it for one more cycle. When a stage stalls, it keeps the instruction currently residing in it for another cycle and then restarts all stage activities exactly as in the non-stalled case.

The pipeline unit on which each instruction is to be executed is determined at run time by the instruction loader 18 when instructions are fetched from main memory.

The instruction loader 18 decodes prefetched instructions, tries to pack them into instruction pair entries and presents them to the dual-pipeline. If the instruction cache 22 is enabled (as discussed above), cacheable instructions can be stored in the instruction cache 22. In this case, an entry containing an instruction pair or a single instruction is also sent to the instruction cache 22 and stored there as a single cache entry. On instruction cache hits, stored instruction pairs are retrieved from the instruction cache 22 and presented to the dual-pipeline for execution.

The instruction loader 18 attempts to pack instructions into pairs whenever possible. The packing of two instructions into one entry is possible only if the first instruction can be executed by integer pipeline unit 24 and both instructions are less than a preselected maximum length. If it is impossible to pack two instructions into a pair, then a single instruction is placed in Slot B.

Two instructions can be paired only when all of the following conditions hold: (1) both instructions are performance-critical core instructions, (2) the first instruction is executable by integer pipeline unit 24, and (3) the displacement and immediate fields in both instructions use short-encoding (short encoding for all instructions except the Branch instruction is 11 bits and 17 bits for the Conditional Branch and Branch and Link instructions).

Several instructions of the microprocessor 10 instruction set are restricted to run on integer pipeline unit 26 only. For example, because instruction pairs in the instruction cache 22 are tagged by the Slot A address, it is not useful to put a Branch instruction in Slot A since the corresponding Slot B instruction will not be accessible. Similarly, since there is a single arithmetic floating point pipe, it is not possible to execute two arithmetic floating point instructions in parallel. Restricting these instructions to integer pipeline unit 26 makes it possible to considerably simplify the dual-pipe data path design without hurting performance.

Integer unit 26 can execute any instructions in the microprocessor 10 instruction set.

The instruction loader 18 initiates instruction pairing upon an instruction cache miss, in which case it begins prefetching instructions into an instruction queue. In parallel, the instruction loader 18 examines the next instruction not yet removed from the instruction queue and attempts to pack it according to the following algorithm:

Step 1: Try to fit the next instruction into Slot A.

(a) if the next instruction is not performance critical, then go to Step 5.

(b) remove the next instruction from the instruction queue and tentatively place it in Slot A.

(c) if the instruction is illegal for Slot A or if the instruction has an immediate/displacement field that cannot be represented in 11 bits, or if the instruction is not quad-word aligned, then go to Step 4.

(d) otherwise, continue to Step 2.

Step 2: Try to fit the next instruction into Slot B.

(a) if the next instruction is not performance-critical, or the next instruction has an encoded immediate/displacement field longer than 11 bits, or the next instruction is a branch with displacement longer than 17 bits, then go to Step 4.

(b) otherwise, remove the next instruction from the instruction queue, place it in Slot B and go to Step 3.

Step 3: Construct an instruction pair entry.

In this case, both Slot A and Slot B contain valid instructions and all pairing conditions are satisfied. Issue a pair entry and go to Step 1.

Step 4: Construct a single instruction entry.

In this case, Slot A contains an instruction which cannot be paired. Move this instruction to Slot B. If this instruction contains an immediate/displacement field longer than 17 bits, or it is a branch with displacement longer than 17 bits, and is not quad-word aligned, then replace it with UNDefined. Issue the entry and go to Step 1.

Step 5: Handle non-performance-critical instructions.

Remove the next instruction from the instruction queue and send it to the instruction emulator 20. When finished with this instruction, go to Step 1.

The just-described pairing algorithm packs two instructions whenever they can be held in a single instruction cache entry. However, these instructions may happen to be dependent, in which case they cannot be executed in parallel. The dependencies are detected by the execution processor 14.

It should be understood that various alternatives to the embodiment of the invention described herein may be utilized in practicing the invention. It is intended that the following claims define the scope of the invention and that methods and apparatus within the scope of these claims and their equivalents be covered thereby.

What is claimed is:

1. A microprocessor that includes first and second parallel-operating execution units such that each of the first and second execution units responds to periodic cycles of a system clock signal by executing instructions in parallel with the execution of instructions by the other of the first and second execution units, encoded instructions being retrieved from a main memory that is connectable to the microprocessor via a system bus, the encoded instructions stored in the external main memory including encoded core instructions and encoded non-core instructions, the microprocessor comprising:

an instruction cache that includes a plurality of individual instruction cache entries, each individual instruction cache entry including a first storage slot for storing a first partially-decoded instruction and a second storage slot for storing a second partially-decoded instruction;

a bus interface unit connected to the system bus for retrieving encoded core instructions and encoded non-core instructions from the external main memory;

an instruction loader that is connected to the bus interface unit for translating a first encoded core instruction to a first partially-decoded instruction and a second encoded core instruction to a second partially-decoded core instruction, and that is connected to the instruction cache for sequentially storing the first and second partially-decoded instructions in the first and second storage slots, respectively, of a selected instruction cache entry, the instruction loader including means responsive to a non-core instruction received from the bus interface unit for, (a) in the event that the non-core instruction corresponds to a single core instruction that performs the same operation as the non-core instruction,
(i) translating the non-core instruction to a decoded version of the single corresponding core instruction;
(ii) storing the decoded single corresponding core instruction in the instruction cache; and
(iii) providing the decoded single corresponding core instruction to a selected one of the first and second execution units for execution thereby;

(b) in the event that the non-core instruction corresponds to a sequence of first and second core instructions that perform the same operation as the non-core instruction,
(i) translating the non-core instruction into the sequence of the first and second decoded corresponding core instructions;
(ii) storing the first and second decoded corresponding core instructions in the first and second storage slots, respectively, of a single instruction cache entry; and
(iii) sequentially providing the first and second decoded corresponding core instructions to a selected one of the first and second execution units for execution thereby; and (c) in the event that the non-core instruction corresponds to a sequence of three or more core instructions,
(i) providing the non-core instruction to an emulator connected to the instruction loader for generation by the emulator of said sequence of core instructions corresponding to the non-core instruction;
(ii) storing a pointer corresponding to the first core instruction in said sequence of core instructions in the instruction cache; and
(iii) providing said sequence of core instructions generated by the emulator to a selected one of the first and second execution units for execution thereby.

2. A microprocessor-implemented method of executing instructions, the microprocessor including first and second parallel-operating execution units such that each of the first and second execution units responds to periodic cycles of a system clock by executing instructions in parallel with the execution of instructions by the other of the first and second execution units, the encoded instructions being retrieved from a main memory that is external to the microprocessor and that is connectable to the microprocessor via a system bus, the encoded instructions stored in the external main memory including encoded core instructions and encoded non-core instructions, each non-core instruction corresponding to a sequence of one or more core instructions, the method comprising:

(a) retrieving an encoded non-core instruction from the external main memory;

(b) in the event that the non-core instruction corresponds to a single core instruction that performs the same operation as the non-core instruction
(i) translating the non-core instruction to a decoded version of the single corresponding core instruction;
(ii) storing the decoded single corresponding core instruction in the instruction cache; and
(iii) providing the decoded single corresponding core instruction to a selected one of the first and second execution units for execution thereby;

(c) in the even that the non-core instruction corresponds to a sequence of first and second core instructions that performs the same operation as the non-core instruction,
(i) translating the non-core instruction into the first and second corresponding decoded core instructions;
(ii) storing the first and second corresponding decoded core instructions in the first and second storage slots, respectively, of a single instruction cache entry; and
(iii) sequentially providing the first and second corresponding decoded core instructions to a selected one of the first and second execution for execution thereby; and (d) in the even that the non-core instruction corresponds to a sequence of three or more core instructions that performs the same operation as the non-core instruction
(i) generating the sequence of three or more core instructions;
(ii) storing a pointer corresponding to the first core instruction in the sequence of three or more core instructions in the instruction cache; and
(iii) sequentially providing the sequence of three or more core instructions to a selected one of the first and second instruction units for execution thereby.

* * * * *

UNITED STATES PATENT AND TRADEMARK OFFICE
CERTIFICATE OF CORRECTION

PATENT NO. : 5,481,751
DATED : January 2, 1996
INVENTOR(S) : Donald B. Alpert et al.

It is certified that error appears in the above-indentified patent and that said Letters Patent is hereby corrected as shown below:

In Col. 12, line 36, please delete "even" and replace with --event--.

In Col. 12, line 49, please delete "even" and replace with --event--.

Signed and Sealed this

Second Day of April, 1996

*Attest:*

BRUCE LEHMAN

*Attesting Officer*     *Commissioner of Patents and Trademarks*